United States Patent [19]
Rosenberg et al.

[11] Patent Number: 5,634,021
[45] Date of Patent: May 27, 1997

[54] SYSTEM AND METHODS FOR GENERATION OF DESIGN IMAGES BASED ON USER DESIGN INPUTS

[75] Inventors: Daniel Rosenberg, San Jose; Anne C. Way, Livermore, both of Calif.

[73] Assignee: Borland International, Inc., Scotts Valley, Calif.

[21] Appl. No.: 746,733

[22] Filed: Aug. 15, 1991

[51] Int. Cl.$^6$ .................................................. G06F 15/00
[52] U.S. Cl. ......................... 395/353; 395/964; 395/50
[58] Field of Search .................................. 395/155–161, 395/600; 364/419.19

[56] References Cited

U.S. PATENT DOCUMENTS

| | | | |
|---|---|---|---|
| 4,965,743 | 10/1990 | Malin et al. | 364/513 |
| 5,016,204 | 5/1991 | Simoudis et al. | 364/578 |
| 5,123,057 | 6/1992 | Verby et al. | 382/37 |
| 5,148,370 | 9/1992 | Litt et al. | 364/468 |
| 5,182,793 | 1/1993 | Alexander et al. | 395/13 |
| 5,195,172 | 3/1993 | Elad et al. | 395/50 |
| 5,197,005 | 3/1993 | Shwartz et al. | 364/419 |
| 5,218,555 | 6/1993 | Komai et al. | 395/900 |
| 5,222,155 | 6/1993 | Delanoy et al. | 382/30 |
| 5,249,257 | 9/1993 | Akahori et al. | 395/3 |
| 5,265,173 | 11/1993 | Griffin et al. | 382/22 |
| 5,276,775 | 1/1994 | Meng | 395/55 |

FOREIGN PATENT DOCUMENTS

| | | | |
|---|---|---|---|
| 0431638 | 6/1991 | European Pat. Off. | G06F 15/72 |
| 0443184 | 8/1991 | European Pat. Off. | G06F 3/033 |

OTHER PUBLICATIONS

Cakmakov et al., "A Multimedia Cognitive–Based System Model," *Proceedings Advanced Computer Technology, Reliable Systems and Applications*, 5th Annual European Computer Conference, Bologna, Italy, May 13–16, 1991, pp. 282–286.

Hutflesz et al., "The R–File: An Efficient Access Structure for Proximity Queries," *Proceedings Sixth International Conference on Data Engineering*, Los Angeles, California, Feb. 5–9, 1990, pp. 372–379.

Dhar et al., *Integer Programming vs. Expert Systems: An Experimental Comparison*, Communications of the ACM, vol. 33, No. 3, pp. 323–336, Mar. 1990.

Fienberg et al., *Graphical Methods and Statistics*, American Statistician, vol. 33, No. 4, pp. 165–177, Nov. 1979.

Simkin et al., *An Information–Processing Analysis of Graph Perception*, Journal of the American Statistical Association, vol. 82, No. 398, pp. 454–465, Jun. 1987.

*Primary Examiner*—Mark R. Powell
*Assistant Examiner*—Huynh Ba
*Attorney, Agent, or Firm*—John A. Smart; Michael J. Ritter

[57] ABSTRACT

The present invention provides an expert system for suggesting and providing graphic design selections based on a user's desired result. The invention provides a plurality of descriptors to define the characteristics of an output page or document. A user can "scale" or "weight" the descriptors, as desired. The present invention utilizes the weighted descriptors to select a number of solutions from a predefined database of possible solutions. The "fit" of each database solution to the user criteria is determined via an intelligent search. Initially, solutions that do not satisfy rejection constraints are identified and eliminated. These rejection constraints are binary constraints and may be the result of output device limitation, intended audience, environment of use, availability of color, etc. The elimination of solutions that do not meet the rejection constraints reduces the population of possible solutions, simplifying further researches and analysis. The solution process then compares a vector generated by the user scaled descriptors to vectors that define the possible solutions based on the same descriptors. A plurality of levels of closeness of fit are described. A user can "step through" all solutions within a particular range of fit.

11 Claims, 15 Drawing Sheets

MASTER PAGE 1

INFORMAL->FORMAL 6.2
SIMPLE->FANCY 5.1
VIVID->SUBDUED 7.0
ENTERTAINING->SERIOUS 4.8
COMTEMPORARY->TRADITIONAL 5.5
☒ B/W PAPER ☒ B/W TRANSPARENCY
☐ COLOR PAPER ☐ COLOR TRANSPARENCY
☐ SLIDE ☐ SCREEN

MASTER PAGE 2

INFORMAL->FORMAL 1.8
SIMPLE->FANCY 6.2
VIVID->SUBDUED 1.2
ENTERTAINING->SERIOUS 1.6
COMTEMPORARY->TRADITIONAL 1.6
☒ B/W PAPER ☒ B/W TRANSPARENCY
☒ COLOR PAPER ☒ COLOR TRANSPARENCY
☒ SLIDE ☒ SCREEN

MASTER PAGE 3

INFORMAL->FORMAL 6.7
SIMPLE->FANCY 1.8
VIVID->SUBDUED 4.9
ENTERTAINING->SERIOUS 3.1
COMTEMPORARY->TRADITIONAL 4.0
☒ B/W PAPER ☒ B/W TRANSPARENCY
☐ COLOR PAPER ☐ COLOR TRANSPARENCY
☒ SLIDE ☒ SCREEN

MASTER PAGE 4

INFORMAL->FORMAL 3.3
SIMPLE->FANCY 2.2
VIVID->SUBDUED 4.0
ENTERTAINING->SERIOUS 2.3
COMTEMPORARY->TRADITIONAL 2.4
☐ B/W PAPER ☐ B/W TRANSPARENCY
☒ COLOR PAPER ☒ COLOR TRANSPARENCY
☒ SLIDE ☒ SCREEN

MASTER PAGE 5

INFORMAL->FORMAL 1.9
SIMPLE->FANCY 3.5
VIVID->SUBDUED 6.4
ENTERTAINING->SERIOUS 7.0
COMTEMPORARY->TRADITIONAL 6.1
☒ B/W PAPER ☒ B/W TRANSPARENCY
☒ COLOR PAPER ☒ COLOR TRANSPARENCY
☒ SLIDE ☒ SCREEN

MASTER PAGE 6

INFORMAL->FORMAL 5.5
SIMPLE->FANCY 4.5
VIVID->SUBDUED 4.3
ENTERTAINING->SERIOUS 4.9
COMTEMPORARY->TRADITIONAL 3.3
☒ B/W PAPER ☒ B/W TRANSPARENCY
☒ COLOR PAPER ☒ COLOR TRANSPARENCY
☒ SLIDE ☒ SCREEN

*FIG. 1*

Font 1 - Avant Garde the quick brown fox jumps over the lazy dog.

THE QUICK BROWN FOX JUMPS OVER THE LAZY DOG.

INFORMAL->FORMAL 5.3
CONTEMPORARY->TRADITIONAL 1.9
SIMPLE->FANCY 1.7

Font 2 - San Francisco the quick brown fox jumps over the lazy dog.

THE QUICK BROWN FOX JUMPS OVER THE LAZY DOG.

INFORMAL->FORMAL 1.0
CONTEMPORARY->TRADITIONAL 2.5
SIMPLE->FANCY 4.6

Font 3 - Zapf Chancery the quick brown fox jumps over the lazy dog.

THE QUICK BROWN FOX JUMPS OVER THE LAZY DOG.

INFORMAL->FORMAL 3.3
CONTEMPORARY->TRADITIONAL 4.8
SIMPLE->FANCY 6.1

Font 4 - London the quick brown fox jumps over the lazy dog.

THE QUICK BROWN FOX JUMPS OVER THE LAZY DOG.

INFORMAL->FORMAL 6.4
CONTEMPORARY->TRADITIONAL 7.0
SIMPLE->FANCY 7.0

Font 5 - Palatino the quick brown fox jumps over the lazy dog.

THE QUICK BROWN FOX JUMPS OVER THE LAZY DOG.

INFORMAL->FORMAL 6.1
CONTEMPORARY->TRADITIONAL 4.0
SIMPLE->FANCY 3.7

Font 6 - Los Angeles the quick brown fox jumps over the lazy dog.

THE QUICK BROWN FOX JUMPS OVER THE LAZY DOG.

INFORMAL->FORMAL 1.8
CONTEMPORARY->TRADITIONAL 2.5
SIMPLE->FANCY 1.3

FIG. 2

Master Page Advisor: Default Master

| | | |
|---|---|---|
| Informal | ←□ □ □□→ —301A | Formal |
| Simple | ←□ □ □□→ —301B | Fancy |
| Vivid | ←□ □ □□→ —301C | Subdued |
| Entertaining | ←□ □ □□→ —301D | Serious |
| Contemporary | ←□ □ □□→ —301E | Traditional |

Output:  ☒ B&W paper     ☒ B&W transparency
         ☐ Color Paper   ☐ Color transparency
         ☐ 35mm slide    ☐ Screen show Environment: ☐ Dark room     ☐ Light room Country  [ USA        ↓ ]

Recommended master pages:

[         ]   [         ]   [         ]
Master page 1   Master page 2   Master page 3

[ Next ]      [ Previous ]    [ Reset ]
[ Advise ]    [ Apply ]       [ Cancel ]

—305
GRAY UNTIL SCALE IS CHANGED

*FIG. 3*

TITLE HERE
Subtitle Here

✓ First major point
✓ Second major point
✓ Third major point
✓ Fourth major point
✓ Fifth major point

*FIG. 10D*

SYSTEM AND METHODS FOR GENERATION OF DESIGN IMAGES BASED ON USER DESIGN INPUTS

BACKGROUND OF THE INVENTION

1. Field of the Invention

This invention relates to the field of expert systems.

2. Background Art

Personal computers are often used as a tool to aid in identifying solutions to user requests that can be described in terms of constraints and user selected criteria. An expert system is a system with embedded knowledge concerning a particular subject. A user presents a problem to the expert system. Through appropriate prompting of the user, the expert system arrives at a solution to the problem based on its embedded knowledge.

Prior art expert systems have used a "diagnostic" solution model to solve problems. In a diagnostic solution model, the goal is to traverse a decision tree and arrive at a single, unique solution for a given set of input parameters. The knowledge representation technique traditionally used in a diagnostic solution-based expert system is a rules parsing technique known as "backward chaining." Backward chaining assumes that there is a single end state from which to work backwards to identify a specific diagnosis (solution). Such backward chaining systems have limited application in areas such as design. A design problem may have several equally valid solutions that satisfy the user input parameters. Therefore, backward chaining diagnostic-based solutions that force the expert system to provide a single response to a single set of input parameters are not desired. In trying to prove a goal in backward chaining, assertions that match the antecedents become sub-goals. Proving of all these sub-goals completes the proof of the original goal.

Diagnostic solution-based expert systems may also use "forward chaining." In forward chaining, a set of "first principles" are defined. These first principles are then codified as "if . . . then . . . " rules. In forward chaining, antecedents are defined that lead to consequents. When an assertion matches an antecedent, that link in the forward chain is traversed. When this happens, the datem (instance) corresponding to the consequent is added to the global database. A disadvantage of forward chaining is that it is difficult to establish a dearly defined set of rules for many design problems, and it is impossible to know all valid end states. There could be literally millions of valid end states. Therefore, forward chaining is a limited solution at best and is not effective at implementing a design expert system.

One design problem in particular that can benefit from the use of an expert system is graphic design on a personal computer. Personal computers provide tools for creating professional quality presentation materials. Numerous "desktop publishing" business graphics products are available for computer users to introduce techniques and effects into documents. Personal computer users can customize the overall layout of a page, the text printed on the page, and the colors of text, graphics and backgrounds.

A page layout program is used to control the overall look of a document. The page layout program permits a user to place and arrange blocks of text, graphics, borders, titles, backgrounds, etc., on a page or document.

The presentation of text in a document can be customized by selecting different "fonts" for the text. A font is a collection of character representations that are of a specific typeface (such as courier, times, palatino, helvetica, etc.), combined with a specific typestyle (bold, italic, bold and italic, outline, shadow, etc.).

Graphics and paint programs allow a computer user to "draw" or "paint" using the display of a computer to create graphic images or designs. These graphic images can then be incorporated into presentation documents. Also available are libraries of "clip art," pre-existing images the user may copy and paste into a presentation document.

Many computer systems allow a user to design and create presentation documents that can be displayed on a color display and printed on a color printer. This is particularly important in desktop publishing, where color documents are common.

In addition, the user may desire to display data in the form of a chart or graph. There are a number of dedicated charting and graph programs, as well as charting and graphing tools implemented in spread sheet and/or database programs.

In spite of the availablity of sophisticated tools for creating and generating presentation materials, the typical user uses only a small percentage of the choices available. For example, although there are literally thousands of fonts from which a user can select in preparing documents, studies have shown that most users select conservative business-type fonts such as "times" or "palatino." The majority of computer users are not trained in publishing or printing. Therefore, users are hesitant to experiment with different fonts, page layouts or presentation. Consequently, all documents produced by that user tend to look the same.

A disadvantage of prior art design tools is that a user must tell the tools "what to do." It would be more desirable to have design tools that ask a computer user "what the user wants," and then provides possible solutions to the user's desires.

SUMMARY OF THE PRESENT INVENTION

The present invention provides an expert system for suggesting and providing image design selections based on a user's desired result. The invention provides a plurality of semantic scales to define the characteristics of a presentation document. Each scale permits a user to assign values on a spectrum defined by polar word pairs, (e.g., informal→formal, simple→fancy, traditional→modern, etc.). The user assigns these values to define a desired look of the presentation document. The present invention utilizes these weighted scale values to select a number of solutions from an existing database of possible solutions. The "fit" of each database solution to the user criteria is determined via an "intelligent search".

Initially, solutions that do not satisfy rejection constraints defined by the user are identified and eliminated from further consideration for that search. In the preferred embodiment, these rejection constraints are binary constraints and may be the result of output device limitation (printer vs. slide), intended audience (business vs. sales), environment of use, availability of color, etc. The elimination of solutions that do not meet the rejection constraints reduces the population of possible solutions, simplifying further research and analysis. Alternately, the rejection constraints may be tri-state selections, scalar selections or multiple integer selections.

Each solution in the database is also described by semantic scale values corresponding to the same semantic scales selected by the user. The user-selected scale value is compared to the scale value of the solution. If the scale value of the solution is greater than or less than the user-selected value by more than a predefined amount, those solutions are also eliminated from the database.

The remaining solutions in the database are then represented as N dimensional vectors. These vectors are compared to the multidimensional vector (referred to as an eigen vector) generated by the user selected scale values to determine the closeness of fit of the remaining solutions to the user-determined criteria. This comparison is used to generate an "eigen value" that represents the degree of fit of the existing solution to the user-defined parameters. The solutions with the closest fit are provided as choices to the user. Representations of the choices may be provided on a computer display or the user may be referred to specific pages of hard copy representations of the solutions.

BRIEF DESCRIPTION OF THE DRAWINGS

FIG. 1 illustrates examples of master page solutions utilizing the present invention.

FIG. 2 illustrates examples of font solutions utilizing the present invention.

FIG. 3 illustrates an example of a user interface when selecting a master page.

FIG. 10A–10F illustrate examples of master page layouts for use with the present invention.

DETAILED DESCRIPTION OF THE INVENTION

Figure 4:
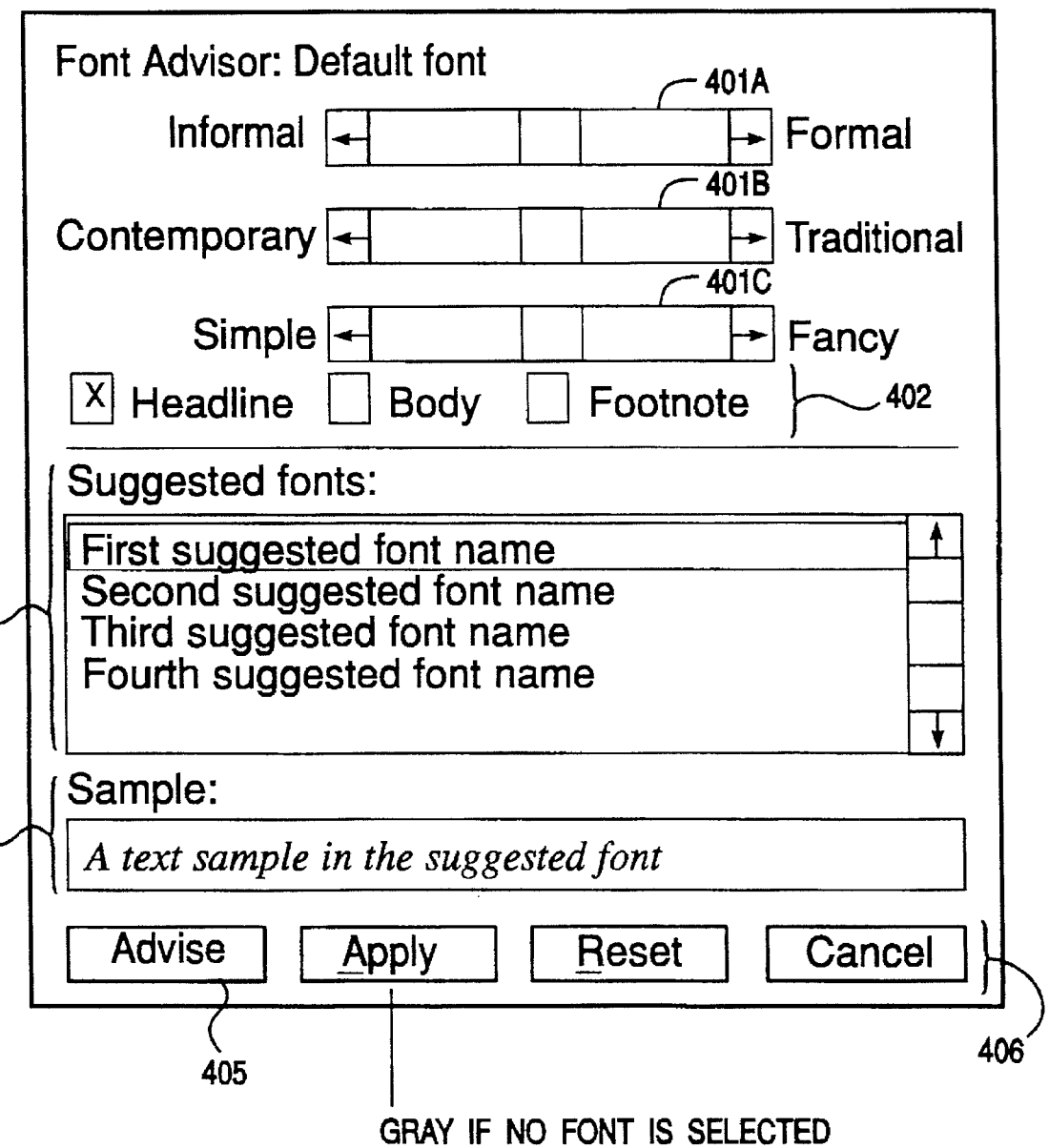
FIG. 4 illustrates a user interface when selecting a font.

An expert system for applications having one or more possible solutions is valid for a given set of constraints is described. In the following description, numerous specific details, such as numbers of descriptors, names of descriptors, etc., are set forth in detail in order to provide a more thorough description of the present invention. It will be apparent, however, to one skilled in the art, that the present invention may be practiced without these specific details. In other instances, well known features have not been described so as not to unnecessarily obscure the present invention.

The present invention has application to any environment where solutions and user parameters can be described in terms of scale values and/or rejection constraints. For example, the present invention may be used to provide an expert system for architectural plans, movies, art, clothing, interior design, etc. The present invention has particular application in design environments, where more than one solution is valid for a given set of input parameters and constraints.

The present invention does not rely on the forward chaining or backward chaining schemes of the prior art. Instead of generating a range of solutions for sets of input parameters, the present invention provides a finite set of pre-encoded descriptors (solutions) and matches them against a set of constraints defined by the user. A "fit" of a given design from the finite set of pre-encoded descriptors to a set of constraints is determined. Thus, the present invention comprises an "intelligent search" for acceptable solutions.

The search technique does not require the definition of formal rules. Rather, the search technique of the present invention requires only a definition of constraints. Any set of constraints can be described as a multi-dimensional vector problem in linear algebra. The appropriateness of fit between any set of descriptors and constraints may be made by a group of expert designers or by a group of typical end users. The constraints can be changed without changing the model to account for cultural differences in graphic visual perceptions.

The search of the present invention is an intelligent search that has rejection constraints (which are binary and must be met); and so called "fuzzy" constraints (which are statistical in nature and can be described as the distance between points in a multi-dimensional space). In the intelligent search, each solution is first checked against the rejection criteria via a simple pattern match algorithm. This reduces the set of acceptable solutions. Those solutions which pass the first rejection criteria are further analyzed to determine those that lie closest to a hypothetical vector (describing the user input) in the multi-dimensional space.

Rejection Constraints

Rejection constraints are binary and are the result of, for example, output device limitation, intended audience, or environment of use. For example, if the user does not have access to a color printer, only those solutions suitable for black and white format are acceptable. Each solution can have an associated single bit that indicates suitability for color or black and white display. The user indicates the type of output device available or desired, and a simple bit matching algorithm is executed to eliminate those solutions that do not match the rejection criteria. The solution population is then reduced so that the ease and speed of searching for acceptable solutions to the remaining criteria is improved. In the preferred embodiment of the present invention, these criteria are based on expert knowledge.

Fuzzy Constraints

This step of the solution process treats each descriptor as a univariant problem and rejects a possible solution if any single solution descriptor value exceeds a user selected descriptor value by a predetermined amount. The system then checks the remaining population of possible solutions that remains for those solutions that lie within an acceptable range of "fit" of a hypothetical vector that describes the user's input in a multi-dimensional space. The vector is generated by the user's scaled weighting of a plurality of factors describing the desired output. For example, the following factors may be considered and weighted by a user:

formal→informal conservative→liberal dark room→light room large group→small group A user selects an appropriate value on a scale for each set of factors. The formal to informal factor can be scaled from one to seven, for example, where one is the most formal and seven is the most informal. Similar scales can be provided for the remaining factors. Consider the case where the user selects a value of three on the formal/informal scale, a value of four on the conservative/liberal scale, a value of five in the dark room/light room scale and a value of six in the large group/small group. The values for these readings can be said to constitute a vector [C] equal to [3, 4, 5, 6] that lies in multi-dimensional space. Such a vector is described in linear algebra as an "eigen vector."

Each possible solution to the user input includes a value for each scale representing the particular value of that solution on that scale. These values can be represented by a two dimensional vector set [T]. In the present invention, [T] is an n x m matrix where n is equal to the number of attributes (scale factors) and m is equal to the number of possible solutions in the set.

To calculate the distance between each existing solution and the user request (the vector [C]), the set of eigen values [E] is calculated that result by taking the root means square (or absolute value) of each row in $[T_{nm}]$ with $[C_n]$. Then the vector [E] that contains the eigen values is sorted. The solution whose eigen values are the lowest are "closest" matched to the input vector [C]. The matrix of eigen values contains a set of scalar integers and is of the size $[E_m]$. The following equation can be used to generate eigen values:

$$[W_n](ABS)([T_{nm}] - [C_n]) = [E_m]$$

$$[E_m] = \sum_{1}^{n} ([W_n])([|[T_{nm}] - [C_n]|])$$

where:

[W] is a scalar vector of size n defining a set of weightings (because the factors could vary in importance).

[C] is an eigen vector of size n defining the hypothetical user input (that is, the attributes of the desired solution).

[T] is an n X m matrix containing the eigen vectors which represent the attributes of the existing solutions.

[E] is an array of eigen values, one per solution, that shows the closeness of fit of that solution to the user request.

Depending on the manner in which the matrices are arranged, suitable dot product and cross product operations may also be used to generate eigen values. The number of rejection constraints and fuzzy constraints can be as large or small as needed without changing the algorithm for determining the closest match.

The description of the present invention as described below is directed to:

1. Generating a solution database;
2. Generating user-determined parameters; and
3. Identifying solutions based on the user-determined parameters.

1. Solution Database

The database of the present invention is generated by using what are referred to herein as "semantic scales." A semantic scale is a scale whose opposite ends are defined by mutually exclusive terms. An example of such a scale is a scale from "formal" to "informal." A user can make a relativistic selection on a semantic scale by selecting a point of the scale representing the degree of formality (or conversely, the degree of informality) desired.

The intended usage is taken into consideration when implementing rankings for the various semantic scales. If the intended users are in the United States, different rankings may be generated than those for intended users in other countries. What may be "traditional" in one country may be considered modern in another. Therefore, different solution databases are generated for each culture/language required.

Each characteristic of a solution may be described by one or more weighted scale factors. When utilizing the present invention, a user assigns weighted values to the same factors to generate a user selection vector. This vector is then compared to the vectors of the population of solutions and suitable solutions to the user requests are determined.

The relevant descriptors for the solutions define a multi-dimensional space. The average value of each descriptor of each solution is used to generate as an eigen vector for that solution. These eigen vector values are stored in a table associated with each of the solutions in the solution database. The number of dimensions of the vector is equal to the number of scales.

The descriptors can be determined by polling a representative group of people. Typical solutions are shown in pairs. The solutions are ranked and compared, two at a time, by using polar adjectives. In this manner, it is possible to determine which adjective pairs are actually meaningful as well as where each solution is ranked on the scale by averaging the selection of typical users. Alternatively, a group of "experts," such as graphic designers, can be polled to determine the average value to be assigned to each weighted descriptor of a selected set of possible solutions.

The following is a representative list of polar adjectives that can be used to weight solutions in a solution database:

conservative→modern formal→informal light hearted→serious warm→cool big audience→small audience light room→dark room sales→lectures business→scientific Any number of polar adjective pairs can be utilized by test subjects in weighting the solutions of the solution database. By analyzing the results of this weighting procedure, the most meaningful and useful adjective pairs can be determined.

2. Generating User-Determined Parameters

The present invention provides a means for a user to establish desired parameters of a presentation document. In the preferred embodiment of the present invention, this is accomplished by prompting a user to assign weighted values to a plurality of descriptors using a selection interface. The descriptors are the same descriptors determined to be the most meaningful in generating the solution database.

Figure 7:
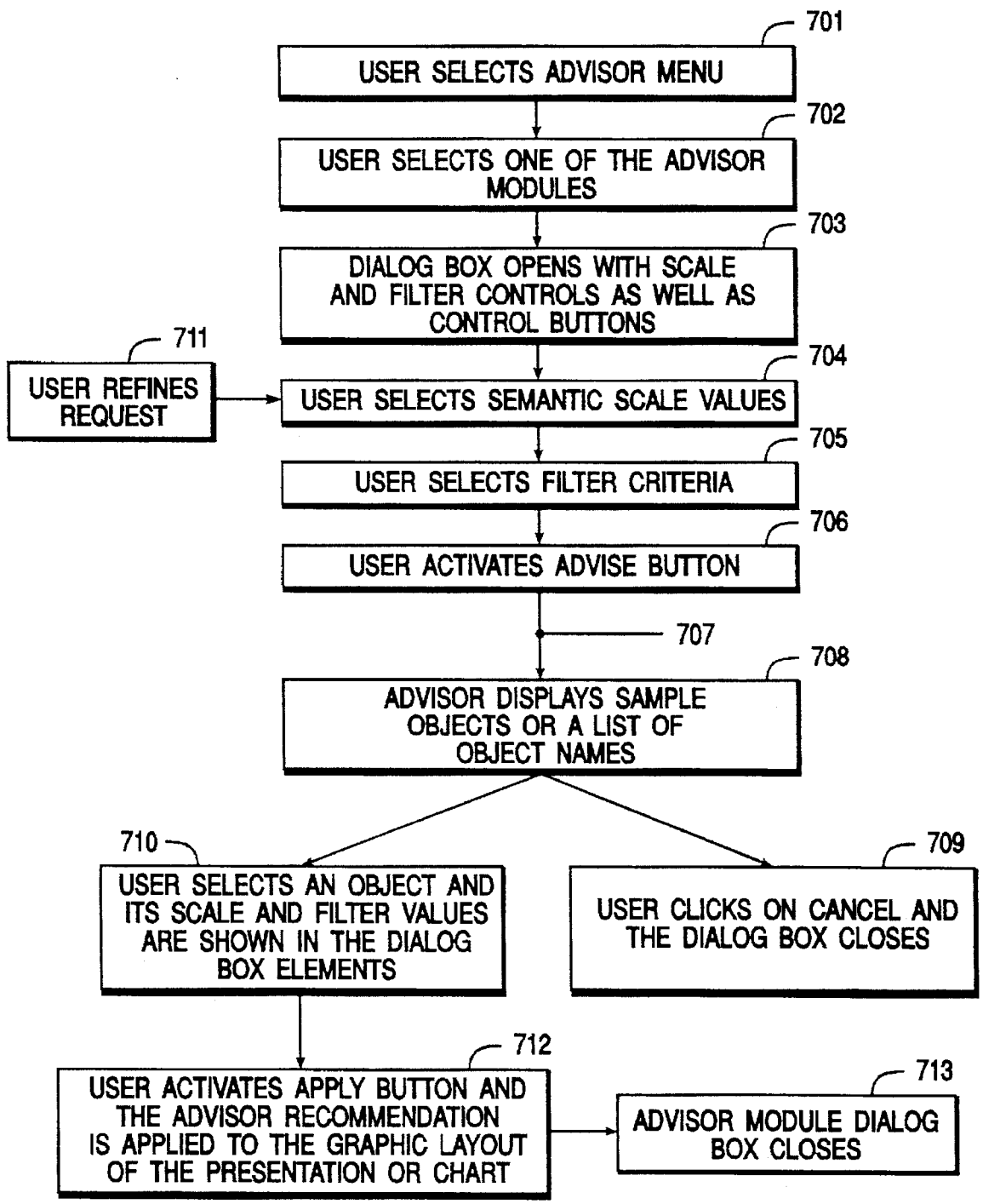
FIG. 7 is a flow diagram illustrating the operation of the present invention.

A flow diagram illustrating the interaction of the user with the selection interfaces of the present invention is illustrated in FIG. 7. At step 701, the user initiates the search process by making a menu selection, such as with a pull-down menu, key command or other means. At step 702, the user selects "advisor modules," which are represented by user interfaces.

At 703, the appropriate user interface is presented to the user. At step 704, the user selects semantic scale values using the selection switches in the appropriate user interface. At step 705, the user selects rejection constraints, also referred to as "filter criteria." At step 706, the user indicates that he has finished making his selections and activates the search function.

At step 707, the search function is performed. This search function is described in detail in connection with the flow chart of FIG. 8 and is not described in detail here. At step 708, solutions that are in the acceptable range of the user-determined criteria are displayed for the user. Alternatively, a list of identification numbers is presented so that the user can look up hard copies of the solutions.

At this stage, the user has two options. At step 709, the user can exit the program at step 709. Alternatively, the user can select one of the suggested solutions at step 710. When the user selects a suggested solution at step 710, the scale and filter values are illustrated for that solution. The scale indicates how close the match is to the user-determined constraints. If desired, the user may choose to refine his original request at step 711 and return to step 704 to select semantic scale values. Alternatively, the user may wish to use the selected solution and "apply" the solution at step 712. In that case, the recommended solution is applied as a solution to the appropriate display environment. At step 713, the user interface dialog box is closed.

3. Identifying Solutions

After the user has set rejection constraints and selected values on the appropriate semantic scales, an intelligent search is executed to identify those solutions in the pre-existing database which most closely match the user parameters. The intelligent search is described in the flow diagram of FIG. 8.

Figure 8:
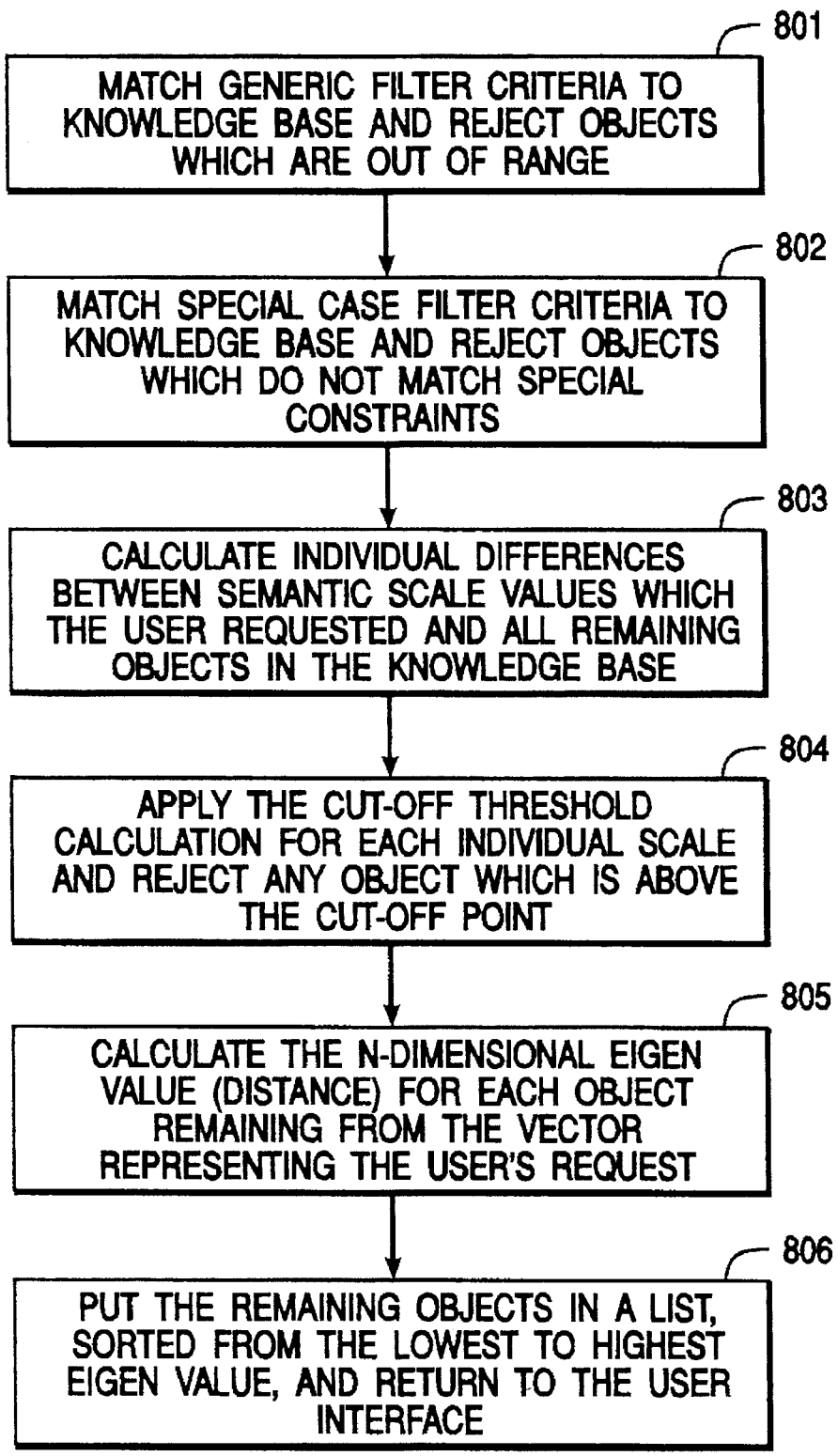
FIG. 8 is a flow diagram illustrating the intelligent search operation of the present invention.

The steps illustrated in FIG. 8 occur after a user has selected rejection constraints and other user-defined criteria. At step 801, general rejection constraint criteria that has been defined by the user is compared to the database of solutions, and those solutions that do not satisfy the general rejection constraints are eliminated.

At step 802, special case rejection constraints (if any) are compared to the remaining solutions in the database, and those remaining solutions that do not satisfy the special case rejection criteria are rejected. At step 803, the individual differences between semantic scale values requested by the user and remaining objects in the solution database are calculated.

At step 804, a threshold value is compared to the calculated value for each solution, and any solutions that are not within the acceptable range are eliminated. In the preferred embodiment of the present invention, the semantic scales have values from 1 to 7. The threshold value in this embodiment has a value of 3.8. Other threshold values can be set without departing from the scope of the present invention. In addition, other threshold values are used when different magnitude semantic scales are utilized.

At step 805, the N-dimensional eigen value for each remaining value in the solution database is calculated based on a vector representing the user's request criteria. At step 806, these objects are sorted in a list from closest match down and provided to a user interface.

Graphic Design System

In the preferred embodiment, the present invention is used to provide an expert system to provide solutions to graphic design problems, such as those encountered in designing a page layout of a presentation document. The following description of such a graphic design expert system is by way of example only. The present invention can be used in other design contexts or in any applications where more than one solution may be suitable for a given set of constraints.

In the preferred embodiment, the invention is used to identify solutions for master page layouts, fonts, colors, chart layout, etc. In the preferred embodiment of the present invention, a user makes decisions concerning: (1) page layout; (2) fonts; (3) color (if necessary); and (4) chart-type (if necessary). Therefore, the present invention provides separate solution databases for each of the user-determined parameters.

The master page layout refers to the overall look of a document. For example, the placement of text in certain regions on a sheet of paper, the use of color, use of borders and/or associated graphics, and the font and size of typefaces are all elements of a master page layout. Font refers to the particular typeface selected for the text portion of a document. Color includes background colors, the color in which the text is printed, and any graphics associated with the document. The chart layout describes the particular type of chart used to graphically represent sampled data.

The evaluation and weighting of solutions is performed for master page layouts, fonts, colors and color combinations, and chart types. (Note, with the number of fonts available for use, it is often difficult for average users to evaluate the formality or informality of a font or to identify differences between fonts. It has been found in the preferred embodiment of the present invention that it is helpful to have fonts evaluated by persons who are expert in typographic and graphic design and to generate the solution database from those evaluations.)

Examples of solutions for master page layouts and fonts are illustrated in FIGS. 1 and 2, respectively. Referring first to FIG. 1, examples of six solutions (master page 1 through master page 6), are illustrated. In the preferred embodiment of the present invention, each master page solution includes five associated semantic scales as follows:

Informal→formal

Simple→fancy

Vivid→subdued

Entertaining→serious

Contemporary→traditional

For each master page, each semantic scale has an associated weighted value that represents the ranking of that page layout on the semantic scale.

In the preferred embodiment of the present invention, an integer value from one to seven is used to rank each semantic scale of each solution. However, the values assigned overall are then averaged, so that solutions may have non-integer values associated with one or more of the semantic scales. Alternatively, each semantic scale of each solution database may be based on any suitable range or on a percentage basis, as well.

Figure 10A:
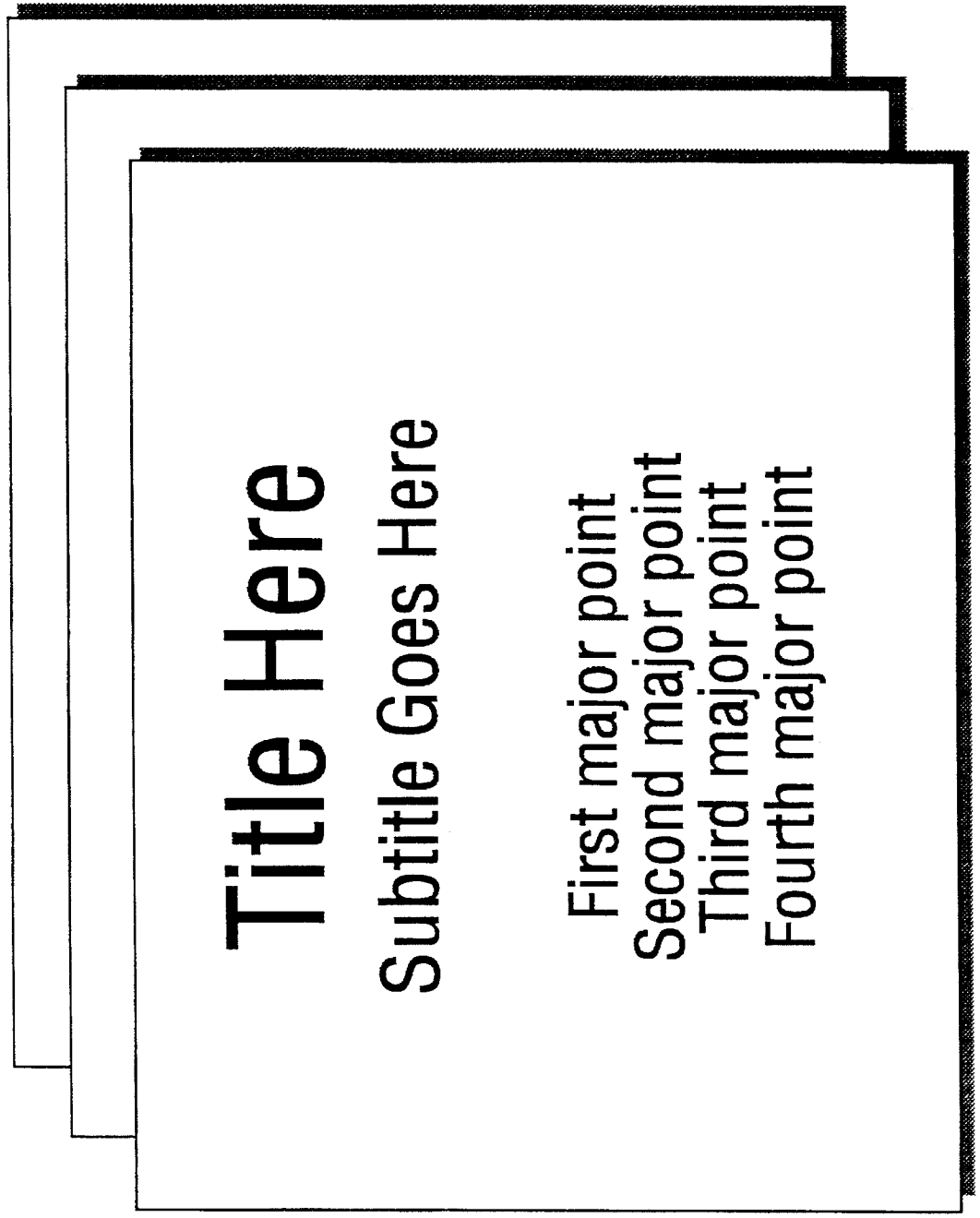

Referring to master page 1, the solution has a ranking of 6.2 on the informal→formal scale. This means that the solution is more formal than informal, but is not the most formal solution (which would have a ranking of 7). The simple→fancy semantic scale is ranked as a 5.1 for master page 1, meaning that it is more fancy than simple. On the vivid→subdued scale, master page 1 has a ranking of 7, meaning it is considered to be the most subdued. On the entertaining→serious scale, master page 1 has a ranking of 4.8, meaning it is more serious than entertaining, and a ranking of 5.5 on the contemporary→traditional scale, meaning that it is more in the traditional style. An example of a master page layout that can be described by these scale values is illustrated in FIG. 10A.

Figure 10B:
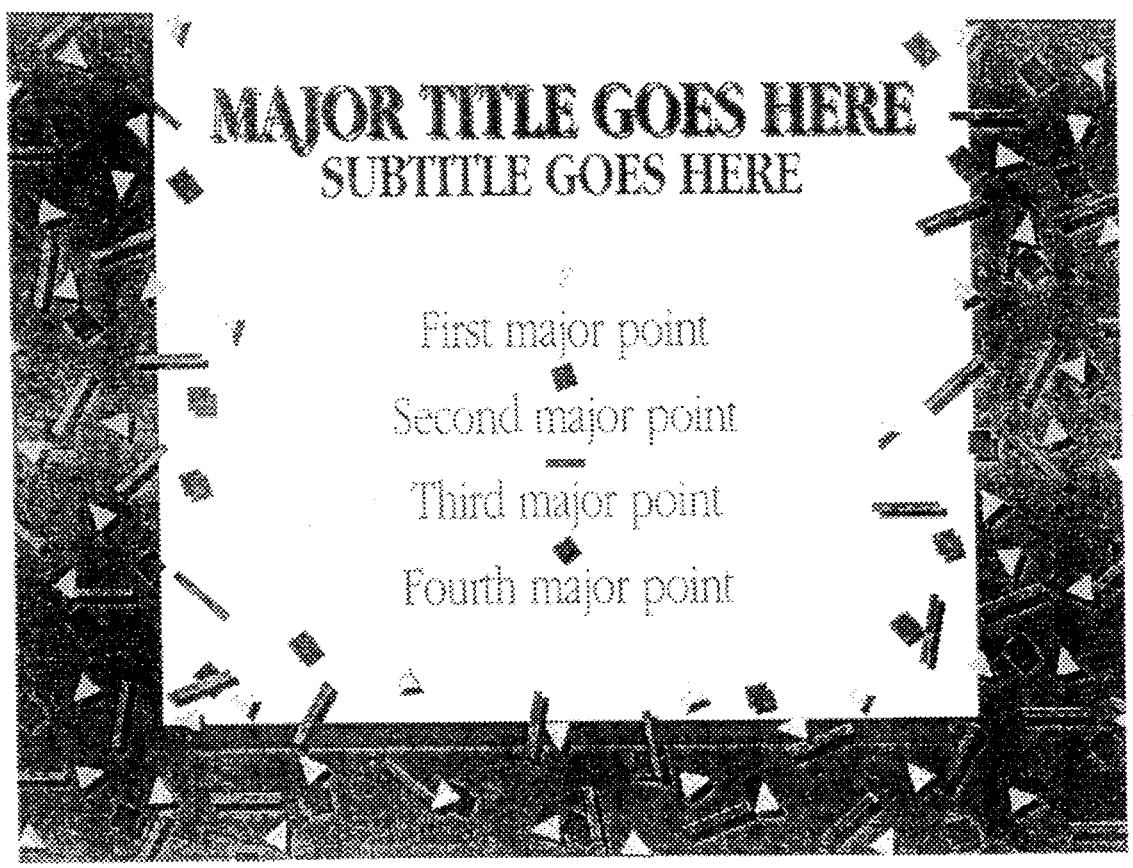

Master page 2 has a ranking of 1.8 on the informal→formal scale, meaning that it is informal. Master page 2 is fancy, with a ranking of 6.2 on the simple→fancy scale. Master page 2 is also vivid and entertaining with rankings of 1.2 and 1.6 on the vivid→subdued scale and entertaining→serious scale, respectively. On the contemporary→traditional scale, master page 2 has received a contemporary ranking of 1.6. An example of a master page layout that can be described by the scale values of master page 2 is illustrated in FIG. 10B.

Figure 10C:

Master page 3 is formal and simple with rankings of 6.7 on the informal→formal scale and 1.8 on the simple→fancy scale. Master page 3 is slightly subdued with a ranking of 4.9 on the vivid→subdued scale. Master page 3 is slightly entertaining with a ranking of 3.1 on the entertaining→serious scale, and has a ranking of 4, midway between contemporary and traditional on that scale. FIG. 10C is an example of a master page layout described by the scale values of master page 3.

Master page 4 is substantially informal and simple with rankings of 3.3 and 2.2 on the informal→formal and simple→fancy scales, respectively. Master page 4 is midway between vivid and subdued, with a ranking of 4, but is entertaining contemporary with rankings of 2.3 and 2.4 on the entertaining→serious scale and the contemporary→traditional scale. An example of such a master page layout is illustrated in FIG. 10D.

Figure 10E:

Master page 5 has a ranking of 1.9 on the informal→formal scale, and a ranking of 3.5 on the simple→fancy scale. Master page 5 is very subdued with a ranking of 6.4 on the vivid→subdued scale and has the most serious ranking on the entertaining→serious scale with a ranking of 7. Master page 5 is also very traditional with a ranking of 6.1 on the contemporary→traditional scale. These scale values describe, for example, the page layout of FIG. 10E.

Figure 10F:
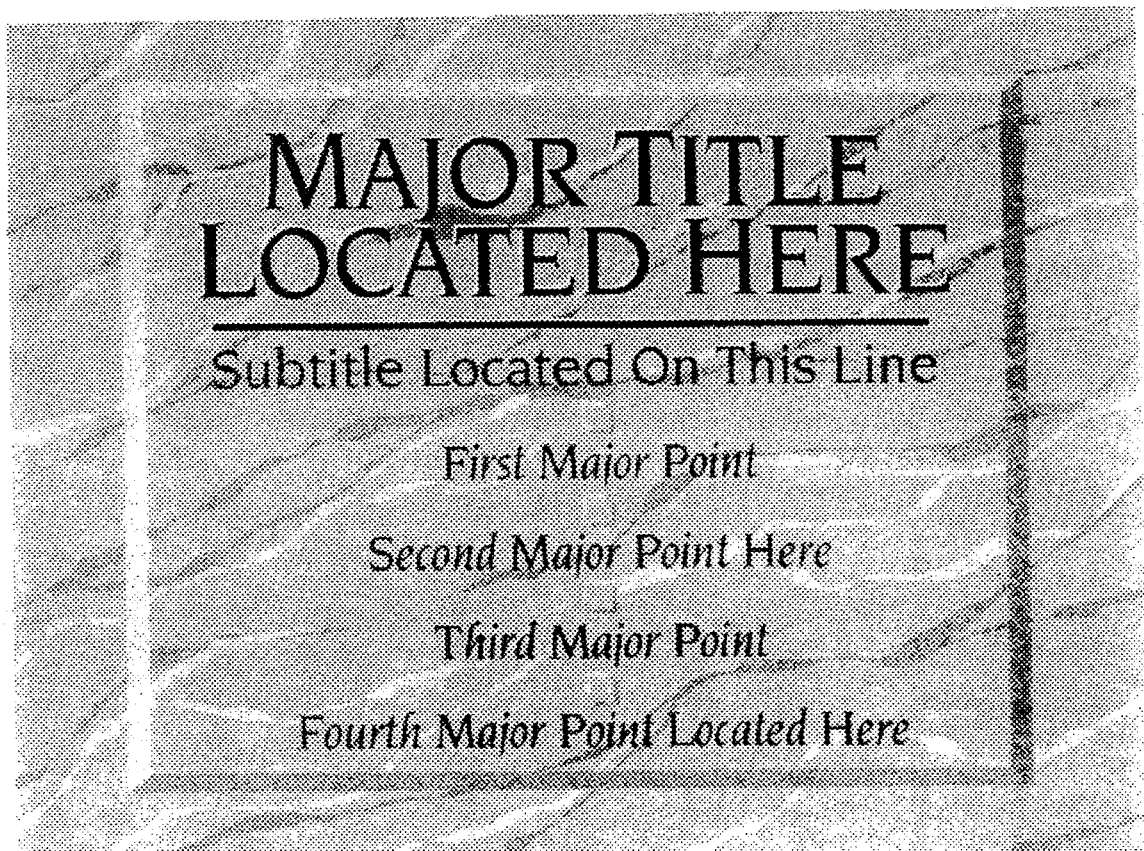

Master page 6 is formal, with a ranking of 5.5 on the informal→formal scale and fancy with a ranking of 4.5 on the simple→fancy scale. Master page 6 is slightly subdued with a ranking of 4.3 on the vivid→subdued scale. Master page 6 is serious with a ranking of 4.9 on the entertaining→serious scale, and is slightly contemporary with a ranking of 3.3 on the contemporary→traditional scale. FIG. 10F is an example of a master page layout described by these scale values.

Each of the master page layout solutions also include rejection constraints. As noted previously, rejection constraints are binary constraints that may be the result of output device limitation or other factors. Still referring to FIG. 1, each of the master page solutions have associated rejection constraint selectors as follows:

black and white paper
black and white transparency
color paper
color transparency
slide
screen show If a master page is suitable for use in a rejection constraint descriptor the box next to the descriptor is checked and the appropriate bit is set in the database associated with the master page.

Master page 1, which is a formal and serious page layout, is suitable for black and white paper and black and white transparencies, but not suitable for colored paper, color transparencies, slide or screen presentations. Master page 2 and 5, which are both informal, are suitable for all presentation methods. Master page 3 is suitable for black and white paper and black and white transparencies, as well as slide and screen presentation, but not for color paper or color transparency. Master page 4 is suitable for color paper and color transparency as well as slide and screen, but not for black and white presentation. Master page 6 is suitable for black and white paper and color paper, but not for black and white or color transparencies, slide or screen presentation.

The master page layouts typically include suggested fonts for text areas. However, these fonts can be overridden or fine tuned by the user. In addition, the user may select fonts when designing a page layout from scratch. Examples of fonts used as solutions in the present invention are illustrated in FIG. 2. FIG. 2 includes six font solutions, font 1 through font 6. These fonts are by way of example only and other fonts can be provided as solutions. In the preferred embodiment of the present invention, the following categories were chosen as being most appropriate for selecting fonts, namely:

Informal→formal
Contemporary→traditional
Simple→fancy

Font 1, referred to as "Avant Garde" has a ranking of 5.3 on the informal→formal scale. This means that it is ranked near the formal end of the semantic scale. Font 1 has a ranking of 1.9 on the contemporary→traditional scale, meaning that it is very contemporary. Font 1 has a ranking of 1.7 on the simple→fancy scale, meaning that it is a simple font.

Font 2, referred to as "San Francisco," is an informal and modern font with a ranking of 1 on the informal→formal scale and a ranking of 2.5 on the contemporary→traditional scale. Font 2 is also slightly fancy, with a ranking of 4.6 on the simple→fancy scale.

Font 3, "Zapf Chancery" is a fancy font, with a ranking of 6.1 on the simple→fancy scale. Font 3 is also informal, with a ranking of 3.3 on the informal→formal scale and slightly traditional with a ranking of 4.8 on the contemporary→traditional scale.

Font 4, known as "London," is very formal with a ranking of 6.4 on the informal→formal scale as well as being very traditional and fancy with rankings of 7.0 on the contemporary→traditional scale and simple→fancy scales, respectively.

Font 5, "Palatino," is a formal font, suitable for business, with a ranking of 6.1 on the informal→formal scale. Font 5 is ranked midway between contemporary and traditional, with a rating of 4.0. Font 5 is also ranked near the middle of the simple→fancy scale, with a ranking of 3.7.

Font 6, "Los Angeles," is very informal and modern, with a ranking of 1.8 on the informal→formal scale and a ranking of 2.5 on the contemporary→traditional scale. Font 6 is a simple font with a ranking of 1.3 on the simple→fancy scale.

The rankings above are for purposes of example only. The present invention is not limited to fonts utilizing these particular valued rankings.

Solution databases are also generated for color schemes and charts.

Graphic Design User Interfaces

Examples of the user interfaces of the graphic design expert system of this invention are illustrated in FIGS. 3–6. Referring first to FIG. 3, an interface for master page layout is illustrated.

In the master page layout interface, the user is presented with five scales 301A–301E corresponding to the semantic scales of the master page solution database of FIG. 1. In the preferred embodiment, each of the scales is a slide scale, with a selector that can be positioned anywhere between the terminal ends of the scale. The preferred embodiment provides a scale having a low value of one and a high value of seven. The user selects the desired value on the scale by positioning the scale selector at the appropriate region of the scale.

The preferred embodiment utilizes an analog scale from one to seven. However, in alternate embodiments, a switch may be utilized that limits the selection to integer values between and including one and seven. Other ranges of values can be used with either a sliding or integer scale. For example, the scale may represent a percentage value from 0–100 percent, with a sliding or integer scale.

The master page interface also includes means for selecting rejection constraint criteria. Region 302 includes a check box located next to each of the rejection constraints stored in the solution database, namely black and white paper, black and white transparency, color paper, color transparency, slide, and screen show. The user selects those rejection constraints that describe the desired output. Mutually exclusive rejection constraints, such as light room/dark room, can be selected in region 303. In this region, only one of the selections may be made since they are mutually exclusive. In addition, the selection of a country or region of interest can be made. For example, USA is selected in FIG. 3. The selection of a country or region recalibrates the solution database to provide appropriate solutions to user selected criteria.

After the user has selected rejection constraints and made selections on the semantic scales, the user initiates the search by activating the "advise" button 305. At that time, an intelligent search is performed and suitable solutions are presented as suggested master pages to the user. In the preferred embodiment of the present invention, a number of solutions that provide the closest fit to the user constraints are displayed in region 304 of FIG. 3, (e.g. "Master page 1, Master page 2, and Master page 3"). These solutions may include an identification number as well as the scale values for that solution. Values referred to as "eigen values" that represent the closeness of fit of the suggested solutions to the user parameters may also be provided. The generation of these eigen values is described in detail below. The user can act on the possible solutions by activating the buttons in region 306. For example, the user can request views of additional or prior groups of solutions by selecting the "Next" and "Previous" buttons, (for example, in FIG. 3, three possible solutions are shown at a time). The user can select one of the solutions by activating the "Apply" button. "Reset" and "Cancel" buttons are also provided for the user. The Reset button restores the settings of the scales and rejection criteria to match the users original input. The Cancel button the interface is closed without changing the state of the presentation document.

In an alternate embodiment, identification numbers of suitable solutions can be provided to the user and the user can refer to a hard copy compilation of the solutions to view the suggested solutions.

The interface for font selection is illustrated in FIG. 4. Three semantic scales 401A, 401B, and 401C correspond to the informal→formal, contemporary→traditional and simple→fancy scales used to describe the font solutions. Rejection constraints used with font selection are illustrated in region 402. These rejection constraints describe the intended use for the selected fonts, such as headline, body of text, and footnote.

After making selections on the scales 401A–401C, the user activates the "advise" button 405 to initiate the search of the present invention. After the search is completed, the names of fonts that are potential solutions are identified in region 403. An example of text using the font of the suggested solution may be displayed for the user in region 404. In an alternate embodiment, the user is directed to hard copy examples of font solutions by index numbers.

The user may select a suggested font solution by activating the "Apply" button in region 406. The user may also activate the "Reset" or "Cancel" buttons from that region.

Figure 5:
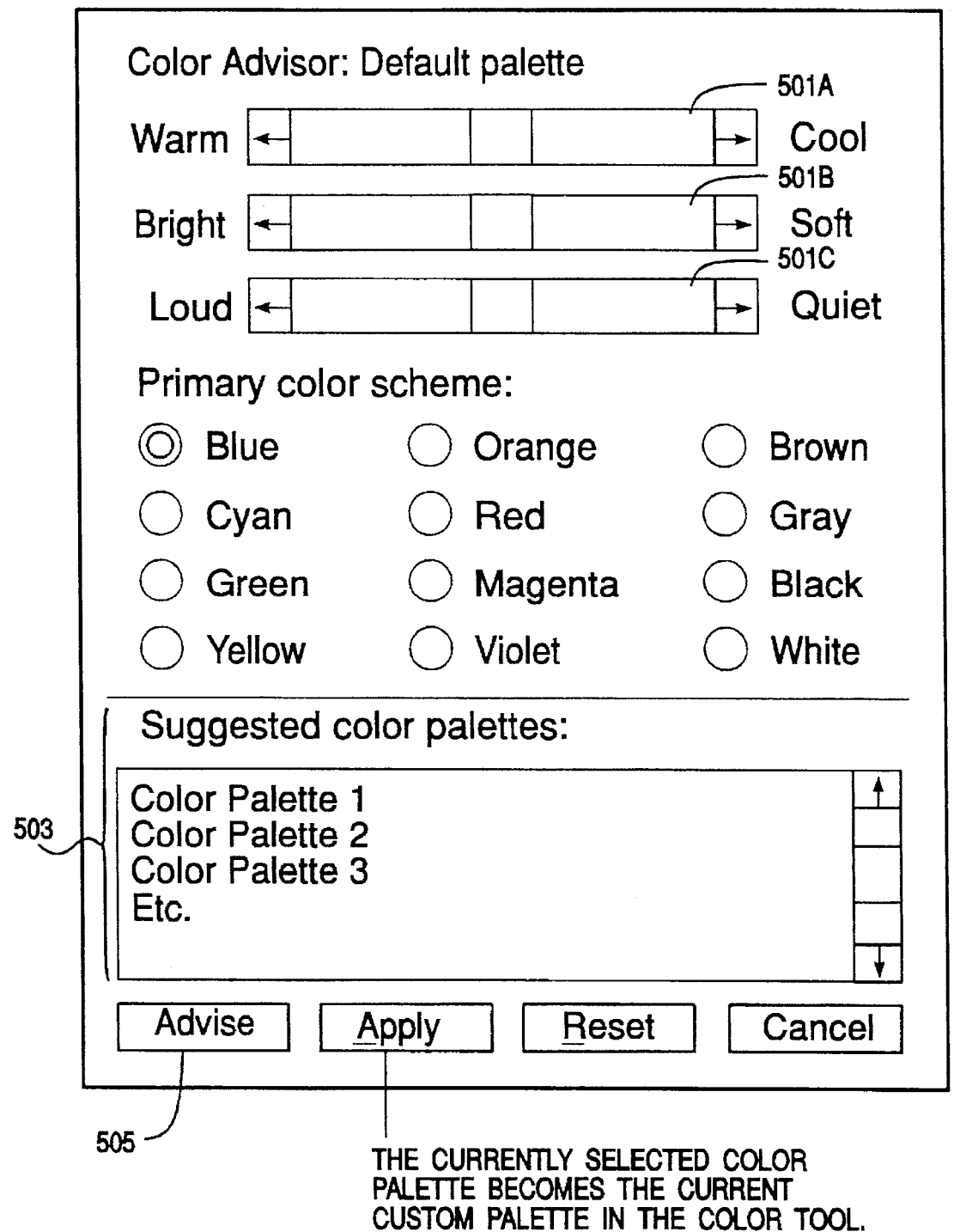
FIG. 5 illustrates a user interface for selecting a color palette.

An interface used for selecting color schemes is illustrated in FIG. 5. Rejection constraints are provided by selecting a primary color scheme. The color solutions may include more than one color, but with one primary color scheme dominating. By selecting the desired primary color scheme, solutions in the database that do not contain that primary color scheme can be quickly eliminated in the intelligent search of the present invention. In the example, of FIG. 5, the following primary color schemes are selectable by a user, blue, cyan, green, yellow, orange, red, magenta, violet, brown, grey, black, and white. Of course other primary color schemes can be used without departing from the scope of the present invention.

Three semantic scale selectors 501A–501C are provided so that the user can describe the "feel" of the color scheme. Semantic scale 501A is a warm→cool scale. Scale 501B is a bright→soft scale and scale 501C is a loud→quiet scale. After the user has initiated a search by activating button "Advise" button 505, suitable solutions are provided in area 503. These solutions may be provided to a display for viewing by the user. The user can select a solution by activating the "Apply" button. The user can also activate the "Reset" or "Cancel" buttons as desired. Alternatively, the user may be referred to a hard copy example of the color scheme for review and selection.

Figure 6:
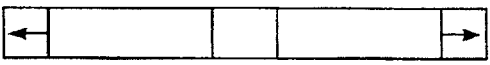
FIG. 6 is a user interface for selecting a numeric chart.

FIG. 6 is an interface used in selecting numeric charts and scales. The interface of FIG. 6 includes three scales, 601A–601C. Scale 601A is an individual→cumulative scale. Scale 601B is a differences→trends scale and scale 601C is a simple→fancy scale. Region 602 is provided to identify the number of variables and the number of observations to be charted. In the preferred embodiment of the present invention, this data is filled in automatically. However, a user can override the selections if desired. After the user makes selections and initiates a search by activating advise button 605, sample charts are provided in region 603 (e.g. Template 1, Template 2, and Template 3). The user can activate the "Apply" button or the "Next", "Previous", "Reset", or "Cancel" buttons of region 604. In an alternate embodiment, indexes to hard copies of sample charts are provided to the user.

The following is an example of the operation of the present invention. In the following example, the selection of master page layouts and fonts for a presentation document are described. The solution database for purposes of this example is that of FIGS. 1 and 2.

Select Constraint for Master Page Layouts

Referring to FIG. 3, a user preparing a document selects the master page layout user interface and selects rejection constraint criteria. In this example, the user wishes to create a color document to be printed on paper. Therefore, the user selects the "color paper" option. The user then proceeds to select values on the semantic scales. The user first selects a value of 4 on the informal→formal scale using selector 301A. A value of 4 is midway between informal and formal in the preferred embodiment of the present invention. On the simple→fancy scale, the user selects a value of 5, desiring a slightly fancy presentation. On the vivid→subdued scale, the user selects a value of 1, one of the most vivid presentations for its color presentation document. On the entertaining→serious scale, the user selects a value of 3 for a slightly entertaining look. On the contemporary→traditional scale, the user selects a 4, desiring a more traditional presentation.

Rejection of Solution Style Sheets Based on Rejection Constraints

Because the user has designated a color paper output for the master page layout of the presentation document, those solutions that are not suitable for color paper output are eliminated in a first pass through the solution database. In the example of FIG. 1, master page 1 and master page 3 do not support color paper output and are eliminated. Master page 2, master page 4, master page 5 and master page 6 all can be used with color paper output and therefore remain as viable solutions.

Calculate Differences

Next, the user selected value on each semantic scale is compared to the semantic scale values of the remaining solutions in the database. Any solutions with a semantic scale value outside a predetermined range when compared to the user selected range values is eliminated. In the preferred embodiment of the present invention, it has been found that a range of 3.8 is acceptable when a position scale is utilized. For the informal→formal scale value of 4 selected by the user, all remaining solutions are within a value of plus or minus 3.8, so all remain as possible solutions. On the simple→fancy scale, the user has selected a value of 5. Therefore, all values greater than 2 are acceptable. In the example of FIG. 1, all remaining solutions have a simple→fancy scale value of 2 or greater. The user has selected a vivid→subdued value of 1. Therefore, any solutions with a value of 4.8 or greater will be eliminated. In this case, master page 5, with a vivid→subdued scale value of 6.4 is eliminated. The entertaining→serious scale has a user value of 3. All of the remaining solutions are within the acceptable range of that value. The contemporary→traditional scale has a user value of 4 and all remaining solutions are within the predetermined range of 3.8 of that value.

At the end of this step of the search, master page 2, master page 4 and master page 6 remain as possible solutions.

Calculate Eigen Value Distance

Next, the "closeness of fit" of the remaining solutions to the user-selected parameters is determined by generating the n-dimensional eigen vector based on the user parameters and calculating the distance from it to the eigen vector calculated for the remaining solutions.

To generate the eigen values, two matrixes are generated. The first matrix, $T_{nm}$ is an n×m matrix, where n is equal to the number of attributes (scale factors) and m is equal to the number of possible solutions in the set. In the present example, there are five scale factors and three possible solutions so that the matrix $T_{nm}$ appears as follows:

$T_{nm}$:

| | Formal | Fancy | Subdued | Serious | Traditional |
|---|---|---|---|---|---|
| Master Page 2 | 1.8 | 6.2 | 1.2 | 1.6 | 1.6 |
| Master Page 4 | 3.3 | 2.2 | 4.0 | 2.3 | 2.4 |
| Master Page 6 | 5.5 | 4.5 | 4.3 | 4.9 | 3.3 |

In this example, the solution database consists of master page 2, master page 4 and master page 6. The scale values for the semantic scales for each of the master pages are entered in the matrix $t_{nm}$.

A vector C is generated which is of size n and consists of the user-generated scale factors. For the present example, the vector C appears as follows:

$C_n$:

| Formal | Fancy | Subdued | Serious | Traditional |
|---|---|---|---|---|
| 4 | 5 | 1 | 3 | 4 |

A scalar vector $W_n$ is also defined. Vector $W_n$ provides a set of weightings to be applied to each scale factor, if desired. Vector $W_n$ appears as follows in this example:

$W_n$:

| Formal | Fancy | Subdued | Serious | Traditional |
|---|---|---|---|---|
| 1 | 1 | 1 | 1 | 1 |

For purposes of the present example, vector $W_n$ is a unit scaling vector with a value of 1. If desired, the relative weights of each semantic scale can be controlled by changing the values in the vector $W_n$.

Next, an array of eigen values, one for each remaining solution in the solution database, is generated using the following equation:

$$[E_m] = \sum_{1}^{n} ([W_n])(|[T_{nm}] - [C_n]|)$$

After performing the above equation on the solution matrix, the array of eigen values, $E_m$ appears as follows:

$E_m$:

| | |
|---|---|
| Master Page 2 | 7.4 |
| Master Page 4 | 8.8 |
| Master Page 6 | 7.9 |

The lower the calculated eigen value, the more closely the solution style sheet matches the user parameters. Based on the solution database of FIG. 1, master page 2, with an eigen value of 7.4, most closely matches the user-selected parameters. Master page 6, with an eigen value of 7.9, is next closest, and master page 4, with an eigen value of 8.8, is the solution with the poorest fit to the user parameters.

If desired, after the eigen values are calculated for the possible solutions, a threshold filter can be applied so that any solutions with an eigen value above a certain amount are eliminated. If no solutions have eigen values below the threshold level, the user is prompted to change the selected parameters. It has been found in the preferred embodiment of the present invention that a threshold value of 12 is useful for master page layout selection and a threshold value of 5 is used for fonts. Of course, other threshold values can be used without departing from the scope of the present invention. Alternatively, the user can elect to override the eigen value filtering and accept the closest fit of the calculated solutions.

Select Constraints for Fonts

After selecting the master page layout based on the intelligent search of the present invention, the user proceeds to select appropriate fonts for the text on the presentation document. Referring to FIG. 4, the user selects a value of 4 on the informal→formal scale to match the selection on the master page layout. It is not required that the user have the same value on the informal→ formal scale in one interface as another. On the contemporary→traditional scale, the user selects a value of 5, desiring a slightly traditional font. On the simple→fancy scale, the user selects a value of 2 so that the font will be relatively simple.

Calculate Differences

After the user has selected values for the each of the scales, the intelligent search function is initiated. Initially, the user-selected value for each semantic scale is compared to the semantic scale value of the solutions in the font database. Any solution with a semantic scale value outside of the predetermined range of 3.8 in the preferred embodiment of the present invention is eliminated as a potential solution. Using this comparison on the solutions of FIG. 2, none of the solutions have values that are outside the acceptable range on the informal→formal scale. Similarly, all of the contemporary→traditional scale values are within the acceptable range, as well. However, on the simple→fancy scale, font numbers 3 and 4 are outside the range and are, therefore, eliminated, leaving fonts 1, 2, 5 and 6 as possible solutions.

Calculate Eigen Value Distance

Now, the closeness of fit of the remaining font solutions to the user-selected parameters can be determined by calculating the distance between the vector generated by the user parameters and the solution style sheets.

Matrix $T_{nm}$ for the remaining possible font solutions appears as follows:

$T_{nm}$:

|  | Formal | Traditional | Simple |
| --- | --- | --- | --- |
| Font 1 | 5.3 | 1.9 | 1.7 |
| Font 2 | 1.0 | 2.5 | 4.6 |
| Font 5 | 6.1 | 4.0 | 3.7 |
| Font 6 | 1.8 | 2.5 | 1.3 |

The vector Cn, based on the user-selected parameters, appears as follows:

$C_n$:

| Formal | Traditional | Simple |
| --- | --- | --- |
| 4 | 5 | 2 |

For purposes of the present example, the vector Wn remains a unit scaling vector with a value of 1. The array of eigen values, one for each remaining solution in the solution database is then generated as before, resulting in an array of eigen values, as follows:

$E_m$:

|  |  |
| --- | --- |
| Font 1 | 4.7 |
| Font 2 | 8.1 |
| Font 5 | 3.4 |
| Font 6 | 5.4 |

Based on the calculated eigen values, font 5, Palatino, with an eigen value of 3.4, is the font which most closely matches the user parameters. The next closest match is font 1, Avant Garde, with an eigen value of 4.7. Font 6 and font 2 are the poorest fitting solutions with eigen values of 5.4 and 8.1, respectively.

Figure 9:
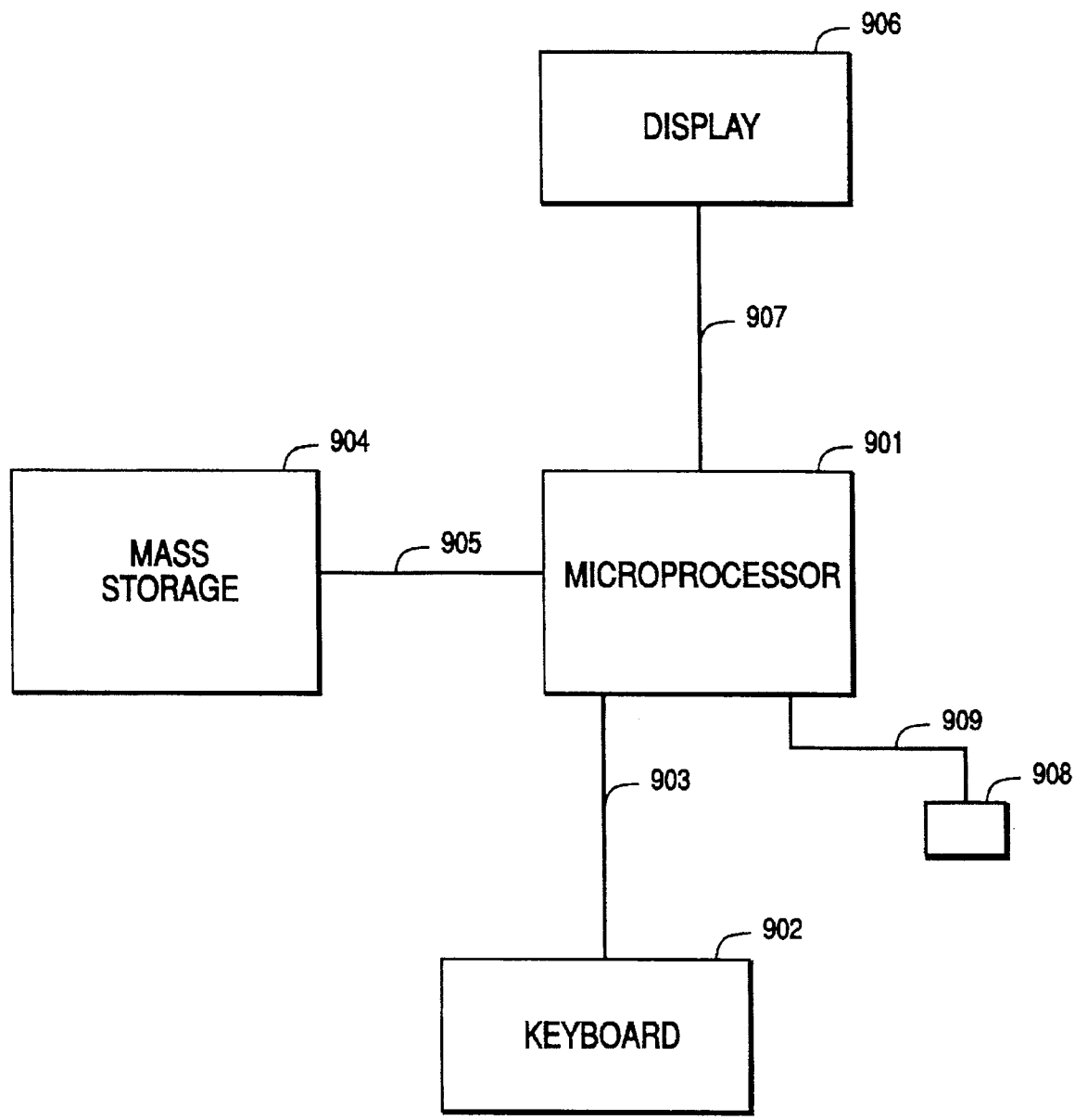
FIG. 9 is a block diagram of a computer system for use with the present invention.

In the preferred embodiment, the present invention is implemented on a personal computer. The personal computer may be a DOS-based computer with a microprocessor such as the Intel 80x86 microprocessor. A block diagram of a computer system for implementing the present invention is illustrated in FIG. 9. The computer system includes a microprocessor 901 coupled to an input/output device, such as keyboard 902 on line 903. The computer system also has associated mass storage 904 coupled to the microprocessor on line 905. A display 906 is coupled to the microprocessor through line 907. A position translating device, such as mouse 908, is coupled to the processor on line 909 and is used to move a position indicator, such as a cursor, on the display 906.

Rejection constraint values and scale values for each solution in the solution database are stored in mass storage 904. The method of the present invention can be implemented as a series of instructions and steps to be executed by the processing means 901. Examples of program code suitable for implementing the master page layout interface, font interface and numeric chart interface in the present invention are illustrated below. In the following example, scaled data is encoded as integers from 1–7 inclusive. Referring briefly to FIG. 3, the scales have a value of 1 on the left-hand side, increasing in integer steps to a maximum of 7 on the right-hand side for purposes of the code described below. The filter numbers are as follows: (1) black and white paper; (2) color paper; (3) 35 mm slide; (4) screen show; (5) B&W transparency; (6) color transparency; (7) light room; and (8) dark room.

This is a section of the advisor code written in the Openscript language created in the Windows programming product ToolBook which executes the main computational loop for the constraint satisfaction algorithm.

When the user interface has received all the data which it needs to compute a solution, it calls the handler "suggestMP." This procedure calculates the solution and displays it in the form of a list. In this example, all of the data and computation is done within the ToolBook environment. The database/knowledge base is stored on a set of ToolBook pages (e.g., cards) one master page per card. The program is the script for the page which contains the advisor user interface.

| to handle suggestMP | This handler is the actual advisor function |
| --- | --- |
| set syscursor to 4 | This turns the mouse cursor to an hourglass shape |

The following section declares a set of variables used to store values during the computation. All of the variables are declared to be local within ToolBook. Other versions can call out to a separate windows DLL.

| | |
| --- | --- |
| local myfirstMP | |
| local mylastMP | |
| local mypage | |
| local mystring | Used as a temporary text holder for output only |
| local whichboxname | Used as a temporary string holder only |
| local rejectMP | Temporary variable, holds the logical sum of the filter criteria |
| local acceptMP | |
| local tempVal | |
| local tempVal2 | |
| local tempVal3 | |
| local tempVal4 | |
| local checkdif | |
| local myfilters | This variable is used as an array of size 8 for filters |
| local myMPscales | This variable is used as an array of size 7 for scales |
| local numberMP | This declares and sets the number of master pages |

Set initial values for beginning, ending and number of masterpages included database. This can be done by counting pages of a given background within ToolBook.

-continued

```
    Put pageNumber of first page of background MasterPageBackground into
myfirstMP.
    Put pageNumber of last page of background MasterPageBackground into
mylastMP.
    Put pageCount of background MasterPageBackground into numberMP.
    Load up the myMPscales 1 through 5 and variables and myfilter1 through
myfilter8 based on the settings in temporary fields and check boxes within the user
interface.
        This section collects the scale values from the user interface.
        Set myMPscales(1) to text of field tempscale1.
        Set myMPscales(2) to text of field tempscale2.
        Set myMPscales(3) to text of field tempscale3.
        Set myMPscales(4) to text of field tempscale4.
        Set myMPscales(5) to text of field tempscale5.
```

This section collects the filter value settings (on or off) from the user interface.

```
step i from 1 to 8
    put "checkboxMPf"&i into whichboxname
    if checked of button whichboxname is true then set myfilter(i)
        to 1
    else
        set myfilter(i) to 0
    end if
end step
```

The actual computation begins here. Run through the rejection criteria. If a particular criteria is not met, set the eigenvalue for that particular page to 999 which just indicates that it is rejected. Then, if the page is not rejected, calculate the actual eigenvalue.

```
step j from myfirstMP to mylastMP       loop through master
                                        pages
    put 0 into rejectMP
    put 0 into acceptMP
    step i from 1 to 8                  loop through 8 filters
    set tempVal to text of recordfield ("MPfilter"&i) of page j
```

This step just adds the filter values of the database with that requested by the user interface. If both values are a "1", then the item is rejected (e.g., the total value is "2"). This is done with a logical bitwise operation in the Windows DLL code for speed, but this approach works fine.

```
set rejectMP to myfilter(i)+tempVal
if rejectMP is 2
    put 999 into text of recordfield MPEigen Value of page j
    break step
end if
end step
```

If the master page is not rejected based on filter criteira, then proceed to next step. This code does the univarient check and then if it passes, computes the actual eigenvalue in one control loop but these are really two separate logical steps.

```
if rejectMP < 2
    step k from 1 to 5
        set tempVal to text of recordfield ("MPscale"&k) of page j
        set checkdif to ABS(myMPscales(k)-tempVal)
```

This is the univarient check. If it fails, the loop is broken and a value of 999 is set to indicate rejection. The maximum eigenvalue is 35 (7 values times 5 scales) so you know 999 is way over the limit.

if checkdif<3.8

This is the threshold value (3.8) for tuning the system to balance type 1 and type 2 errors.

These next two statements build the eigenvector/ eigenvalue. It takes five passes through this loop to account for all five dimensions of the vector.

```
set acceptMP to acceptMP+checkdif
    put acceptMP into text of recordfield MPEigenValue of page j
    else
    put 999 into text of recordfield MPEigenValue of page j
    break step
    end if
    end step
    end if
end step
```

Once the eigenvalues are calculated, the following code sorts the list of master pages to find the lowest values.

sort pages myfirstMP to mylastMP by ascending number text of recordfield MPEigenvalue Lastly, place the sorted list into the scrolling field at the bottom of the user interface screen. First erase the old list displayed in the user interface.

set text of field masterReturnlist to NULL

The following code places limits (acquired from the user interface) on the number of suggestions to be returned to the user. The limit may be based on the number of masterpages requested or a maximum eigenvalue or both.

put text of field AdviceLimit into tempVal3
put text of field EigenLimit into tempVal4
step i from myfirstMP to (myfirstMP+tempVal3−1)
if text of recordfield MPEigenValue of page i<tempVal4

The following two statements simply format the Eigen value so only two decimal places are used when the value is displayed on the screen.

put text of recordfield MPEigenValue of page i into tempVal2 format tempVal2 as "###.00"

The following statements build the text string returned to the user:

```
set mystring to ""&\
    text of recordfield MPname of page i &&\
    "SCL" &&\
    text of recordfield MPscale 1 of page i &&\
    text of recordfield MPscale2 of page i &&\
    text of recordfield MPscale3 of page i &&\
    text of recordfield MPscale4 of page i &&\
    text of recordfield MPscale5 of page i &&\
    "FLT" &&\
```

-continued

```
text of recordfield MPfilter1 of page i &&\
text of recordfield MPfilter2 of page i &&\
text of recordfield MPfilter3 of page i &&\
text of recordfield MPfilter4 of page i &&\
text of recordfield MPfilter5 of page i &&\
text of recordfield MPfilter6 of page i &&\
"EGV" && tempval2 &&LF
```

The next statement causes the string to be added to the list to be displayed on the screen.

```
put mystring after text of field masterReturnList
end if
end step
Set the mouse cursor back to an arrow and end the procedure.
set syscursor to 1
```

The computation is complete and the user interface is updated with the new list of suggestions.

```
        end suggestMP
```

Thus, an expert system has been described.

What is claimed is:

1. In a computer system, a method for assisting a user in creating a design image comprising:
   (a) storing a plurality of master images representing different types of design images, each of said master images being characterized by a plurality of predetermined attributes;
   (b) receiving user input specifying qualities desired by said user, for indicating a preferred design image type desired by said user;
   (c) determining one or more of the master images whose attributes best match qualities desired by said user; and
   (d) presenting to the user output associated with said determined one or more of the master images,
      wherein said plurality of attributes include color, font, and layout attributes.

2. In a computer system, a method for assisting a user in creating a design image comprising:
   (a) storing a plurality of master images representing different types of design images, each of said master images being characterized by a plurality of predetermined attributes;
   (b) receiving user input specifying qualities desired by said user, for indicating a preferred design image type desired by said user;
   (c) determining one or more of the master images whose attributes best match qualities desired by said user; and
   (d) presenting to the user output associated with said determined one or more of the master images,
      wherein before step (b) includes:
         displaying to the user said plurality of attributes as a list of polar adjective pairs.

3. In a computer system, a method for assisting a user in creating a design image comprising:
   (a) storing a plurality of master images representing different types of design images, each of said master images being characterized by a plurality of predetermined attributes;
   (b) receiving user input specifying qualities desired by said user, for indicating a preferred design image type desired by said user;
   (c) determining one or more of the master images whose attributes best match qualities desired by said user; and
   (d) presenting to the user output associated with said determined one or more of the master images,
      wherein step (b) includes:
         displaying a graphic scale for at least one attribute, said graphic scale including a sliding member for entering one of a pre-selected range of values; and
         entering with the sliding member a value desired for said at least one attribute.

4. The method of claim 3, wherein said graphic scale means includes a scroll bar means.

5. In a computer system, a method for assisting a user in creating a design image comprising:
   (a) storing a plurality of master images representing different types of design images, each of said master images being characterized by a plurality of predetermined attributes;
   (b) receiving user input specifying qualities desired by said user, for indicating a preferred design image type desired by said user;
   (c) determining one or more of the master images whose attributes best match qualities desired by said user; and
   (d) presenting to the user output associated with said determined one or more of the master images,
      wherein step (b) includes:
         displaying a graphic toggle means for at least one attribute, said graphic toggle means for entering a selected one of two values; and
         entering with the graphic toggle means a value corresponding to said at least one attribute.

6. A method for intelligently processing user-specified choices in a computer system, the method comprising:
   (a) storing in memory a plurality of available computer tasks, each of which is characterized by a plurality of preset parameters;
   (b) receiving a user-specified qualitative descriptor for each parameter for indicating a desired computer task;
   (c) determining selected ones of the computer tasks whose attributes best match the qualitative descriptors; and
   (d) presenting to the user said selected ones,
   wherein said plurality of parameters are preset according to statistically derived information.

7. A method for intelligently processing user-specified choices in a computer system, the method comprising:
   (a) storing in memory a plurality of available computer tasks, each of which is characterized by a plurality of preset parameters;
   (b) receiving a user-specified qualitative descriptor for each parameter for indicating a desired computer task;
   (c) determining selected ones of the computer tasks whose attributes best match the qualitative descriptors; and
   (d) presenting to the user said selected ones,
   wherein said plurality of parameters are preset according to expert-based information.

8. A method for intelligently processing user-specified choices in a computer system, the method comprising:
   (a) storing in memory a plurality of available computer tasks, each of which is characterized by a plurality of preset parameters;
   (b) receiving a user-specified qualitative descriptor for each parameter for indicating a desired computer task;
   (c) determining selected ones of the computer tasks whose attributes best match the qualitative descriptors;

(d) presenting to the user said selected ones; and (e) choosing one of the selected tasks for execution by the computer system.

9. A method of formatting computer output comprising the steps of:

storing attributes for a plurality of font and layout types in a computer memory, said font and layout types associated with output attributes;

displaying quality descriptors of said computer output;

inputting desired user criteria associated with said quality descriptors, said quality descriptors associated with said output attributes;

identifying at least one font and layout type, from said plurality of font and layout types, closely matching said user criteria based on said output attributes; and providing output with said at least one identified font and layout type.

10. The method recited in claim 9 wherein said quality descriptors are polar adjective pairs.

11. The method as recited in claim 10 wherein said polar adjective pairs are displayed as a sliding member movable by said user.

\* \* \* \* \*